United States Patent
Seeger et al.

(10) Patent No.: US 6,640,010 B2
(45) Date of Patent: *Oct. 28, 2003

(54) WORD-TO-WORD SELECTION ON IMAGES

(75) Inventors: Mauritius Seeger, Royston (GB); Christopher R. Dance, Cambridge (GB); Stuart A. Taylor, Cambridge (GB); William M. Newman, Cambridge (GB)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/438,891

(22) Filed: Nov. 12, 1999

(65) Prior Publication Data

US 2003/0185448 A1 Oct. 2, 2003

(51) Int. Cl.$^7$ .............................. G06K 9/72; G06K 9/34; G06K 9/00; G06K 9/36; G06K 9/10; H04N 1/04
(52) U.S. Cl. ..................... 382/229; 382/176; 382/189; 382/290; 382/321; 358/474
(58) Field of Search ................................. 382/175, 176, 382/177, 179, 180, 186, 187, 188, 189, 229, 289, 290, 310, 311, 321, 322, 323; 358/453, 462, 474; 707/500, 531; 235/454

(56) References Cited

U.S. PATENT DOCUMENTS

| | | | |
|---|---|---|---|
| 5,048,099 A | | 9/1991 | Lee .............................. 382/176 |
| 5,060,980 A | * | 10/1991 | Johnson et al. .............. 283/115 |
| 5,428,694 A | * | 6/1995 | Betts et al. .................. 382/317 |
| 5,511,148 A | | 4/1996 | Wellner ....................... 358/1.6 |
| 5,517,586 A | | 5/1996 | Knowlton .................... 382/292 |
| 5,687,253 A | * | 11/1997 | Huttenlocher et al. ....... 382/177 |
| 5,748,809 A | * | 5/1998 | Hirsch ......................... 382/175 |
| 5,764,383 A | * | 6/1998 | Saund et al. ................. 355/25 |
| 5,893,908 A | * | 4/1999 | Cullen et al. ............... 345/839 |
| 6,178,270 B1 | | 1/2001 | Taylor et al. ............... 382/284 |
| 6,473,523 B1 | | 10/2002 | Newman et al. ........... 382/176 |

OTHER PUBLICATIONS

Newman, W. N., Dance, C., Taylor, A. S., Taylor, S. A., Taylor, M. and Aldhous, T. "CamWorks: A Video–based Tool for Efficient Capture from Paper Source Documents". IEEE International Conference on Mutimedia Computing and Systems (ICMCS), Florence, Italy. Jun. 7–11, 1999.

* cited by examiner

*Primary Examiner*—Mehrdad Dastouri

(57) ABSTRACT

An image processing technique for selecting a text region from an image is described. Character and formatting information for each word in the image is used to determine an active region for each word in the image. For a preferred embodiment of the present invention, the character and formatting information is derived during optical character recognition (OCR). A first and last word within a selected text region is identified based on at least one active region associated with at least one word within the selected text region. Using the first and last words within the selected text region, all words within the selected text region are identified. An image of the selected text region may be displayed. Text contained within the selected text region may be copied to an application program.

34 Claims, 18 Drawing Sheets

200

People from virtually every branch of professional work author electronic documents while referring to paper documents such as books, articles and reports. Despite efforts to develop paperless authoring environments, there is little evidence that the use of paper

FIG. 2

People from virtually every branch of professional work author electronic documents while referring to paper documents such as books, articles and reports. Despite efforts to develop paperless authoring environments, there is little evidence that the use of paper

*FIG. 4*

Perspective

People from virtually every branch of professional work written
academic documents while referring to paper documents such as
books, articles and reports. Despite efforts to develop paperless
authoring environments, there is little evidence that the use of paper

*FIG. 16*

Skew

People from virtually every branch of professional work written
academic documents while referring to paper documents such as
books, articles and reports. Despite efforts to develop paperless
authoring environments, there is little evidence that the use of paper

*FIG. 17* every branch of professional work author electronic documents while referring to paper documents such as books, articles and reports.

FIG. 19

WORD-TO-WORD SELECTION ON IMAGES

BACKGROUND OF THE INVENTION

1. Field of the Invention

The present invention relates to image processing, and more specifically to selecting text regions from an image.

2. Description of Related Art

As technological advances in digital photography continue to increase the performance of digital cameras while reducing their cost, digital cameras may become widely used as document scanners in general office environments. For example, images from a hardcopy document may be captured by a camera positioned over a desktop and digitized for further processing and display on a computer monitor. This type of scanning promotes a "scan-as-you-read" interface between paper and electronic media and is often referred to as "over-the-desk" scanning. An example of such an over-the-desk scanning system is disclosed by Wellner in U.S. Pat. No. 5,511,148 entitled "Interactive Copying System."

One advantage of over-the-desk scanning versus traditional contact scanning is that of convenience because it is not necessary to remove hardcopy documents from their usual place of reading. This encourages a more casual type of scanning where a user is able to scan a small amount information from a document as it is encountered while reading. For example, a short text sequence (e.g., 5–10 words) can be recorded by a camera and then converted to coded text by applying optical character recognition (OCR).

The OCRed version of the selected text may then be copied into a softcopy document where it can be manipulated by a text editing or word processing application on a computer system. This type of scanning saves the user from having to retype the selected text into a computer system.

One approach to scanning a selected text region requires a user to select an entire block of text, which usually includes more text or words then desired. Scanning an entire block region often does not provide the user with adequate control over which words are included in the selection.

Another approach to scanning selected text regions allows a user to select the exact text region he/she is interested in scanning. A user is likely to find this type of selection more user friendly and convenient than selecting entire text blocks. An example of exact word selection is described in published European Patent Application 98304196.3 entitled "Text/Image Selection From Document Images" (EP 0 881 592 A2). According to this publication, the selected text region is extracted from a multiple-bit-per pixel image and de-skewed prior to performing optical character recognition (OCR).

Another example of exact word selection is described in U.S. Pat. No. 5,517,586 entitled "Method and Apparatus For Automatically Specifying A Portion of Text From a Bitmap Image of The Text" to Knowlton (herein after referred to as the "Knowlton Patent"). The Knowlton Patent determines various geometric specifications (e.g., lateral extent of lines of text, slope, periodicity, etc.) of a specified portion of a bitmap image in response to a user providing starting and end points. These geometric specifications may be subsequently passed to a utility that performs OCR.

The examples described above perform text selection prior to OCR. One drawback of performing text selection prior to OCR, as compared to performing text selection after OCR, is that that information derived from OCR may not be used to perform text selection. This may lead to a less responsive (i.e., increased processing time while the user is in the process of text selection) and a less reliable image processing system.

SUMMARY OF THE INVENTION

In accordance with the invention, a method, system, and a computer program product for selecting a text region from an image is described.

BRIEF DESCRIPTION OF THE DRAWINGS

These and other aspects of the invention will become apparent from the following description read in conjunction with the accompanying drawings wherein the same reference numerals have been applied to like parts and in which:

FIG. 2 illustrates an example of an image containing text;

FIG. 4 illustrates an example of an image having word bounding boxes;

FIG. 16 illustrates an example of an image having perspective warp;

FIG. 17 illustrates an example of an image having skew;

FIG. 19 illustrates text selection feedback to a user according to one embodiment of the invention.

DETAILED DESCRIPTION

Figure 1:
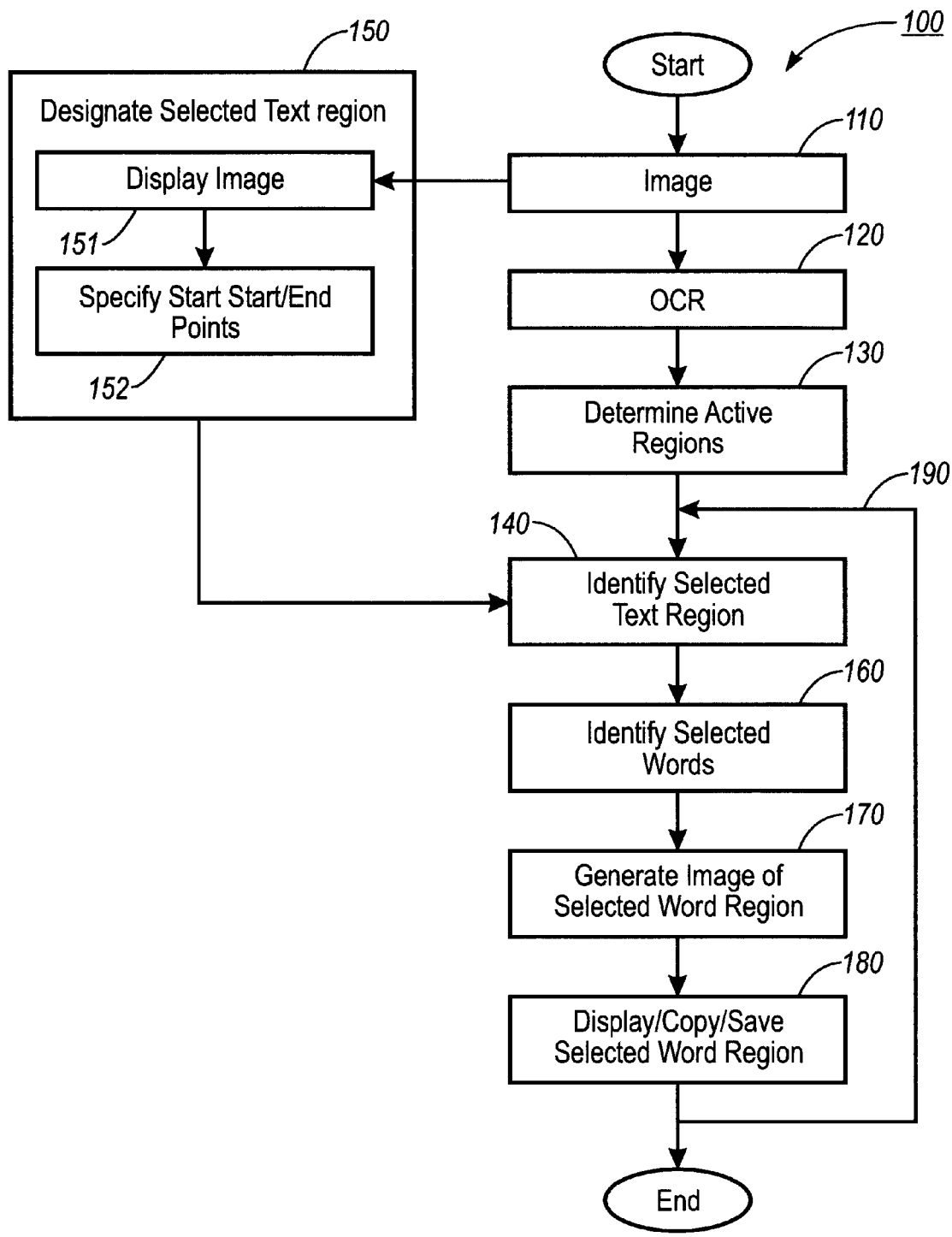
FIG. 1 illustrates a logic flow diagram for word selection from an image according to one embodiment of the present invention.

Various embodiments of the present invention are directed at techniques for selecting a text portion from a multiple bit-per-pixel (e.g., a greyscale, color, etc.) image. The multiple bit-per-pixel image may be acquired by an image capture device such as a video camera or other similar devices. Many of the embodiments described below are particularly well suited for videoconferencing systems, "over-the-desk" scanning systems, and other image processing systems.

In a preferred embodiment of the present invention, a user selects a portion of a displayed image that contains text by specifying start and end points. The displayed image may represent a multiple bit-per-pixel image, which was acquired by an image capture device (e.g., a camera). Based on the user input, a selected text region containing all words between the start and end points is then automatically determined using information derived during optical character recognition (OCR). A selected word region is generated, which can be displayed and/or saved. For example, the selected word region can be saved to a clipboard, which allows information to be transferred between application programs or within an application program via "copy and paste" and/or "cut and paste" operations. In general, a clipboard refers to a special memory resource maintained by operating systems such as Microsoft WINDOWS®. The preferred embodiment provides a fast and convenient method of copying text from multiple bit-per-pixel images (such as document images), especially in conjunction with camera based scanning.

The word selection techniques according to the various embodiments of the present invention can also be performed on skewed or warped images.

There are several advantages to using information derived from OCR to determine the selected word region. For a preferred embodiment of the present invention, the OCR results include document segmentation information (e.g., information relating to the identification of various text, image (picture) and line segment portions of the document image), text information (e.g., ASCII text), and formatting information (e.g., word bounding boxes, text lines, and text regions).

As compared to text selection methods which perform text selection prior to OCR rather than after OCR, the described embodiments of the present invention have an increased responsiveness to selected text region feedback. This is accomplished by performing the majority of the image processing and segmentation prior to user input rather than in response to a user specifying a selected text region. The described embodiments require minimal computation once the selected text region is identified. Thus, a user has to wait a reduced amount of time before obtaining selected text region feedback on the display. This in turn enhances the usability and productivity of the text selection techniques of the described embodiments.

Furthermore, the accuracy and repeatability of the text selection techniques of the described embodiments is also improved over known text selection methods because segmentation (text versus non-text) is dependent upon the entire image rather than based upon the user defined text region. It should be noted that the segmentation results obtained from a selected text region (as compared to an entire image) may vary depending upon how many words are selected or where the user first clicks when selecting a word. In contrast, when the segmentation results obtained from (or prior to) OCR for the entire image are used, the selection of a given word is constant regardless of other words that may have been selected. Also, the segmentation results from OCR allow unwanted components in the image (e.g., non-text items) to be eliminated. Scale can also be detected more reliably when using an entire image rather than the selected text region. Furthermore, parameters describing the degradation of text and describing the grammatical context of a text region are important for reliable OCR. Again, these parameters are hard to estimate from small image regions. Thus if OCR is to be used, it is beneficial to process a large region, rather than just a small area indicated by the user.

Additionally, the text selection methods of the described embodiments can use the OCR results to adapt the selection to a wider context. For example, it is possible to adapt the reading order depending upon the language (e.g., Chinese, Hebrew, etc.). Another example of the use of OCR results in the adaptation of the text selection is in the detection of the orientation of text in charts, figures and tables. Also, it is possible to change the word and line spacing dependent upon character types (e.g., ascender, descenders, etc.) and punctuation marks (e.g., hyphenation, etc.).

FIG. 1 illustrates a logic flow diagram 100 for selecting a text region from an image according to one embodiment of the present invention. A multiple bit-per-pixel image is acquired from an image capture device such as a scanning device, video camera, etc., as shown in box 110. When acquiring an image from a video camera, the image can be frozen by having the user select a "freeze" button, a "selection-mode" button, upon designating a starting point (or other point) of a selected text region by a user, or other methods known to stop the motion of a camera.

The acquired image often needs to be processed by various known imaging techniques (e.g., segmentation, binarization, etc.) to make it a suitable image for OCR. For example, an OCR algorithm may require a binary image as an input image. In general, optical character recognition (OCR) refers to interpreting the bit-mapped representation of an image into the corresponding characters or symbols. The term "bit-map image" refers to any image in which each pixel is represented by one or more bits.

The image includes text and may also include non-text items (e.g., pictures). The term "text" refers to characters, symbols, and/or objects capable of being recognized by a particular OCR engine used and "non-text" refer to all other items in the image. Thus, a text region typically includes alphabets, numbers, objects and/or symbols used in the English language or other languages. FIG. 2 illustrates an example of an image 200 containing text. In general, words are formed by one or more recognized text characters.

In box 120, the OCR performed on the image may be implemented by a number of OCR engines well known to those skilled in the art. During OCR, the bitmap representation of the image is interpreted and converted into coded text. The text information, along with formatting information (e.g., bounding boxes, text region and text lines associated with each word) may be stored in a file.

Figure 3:
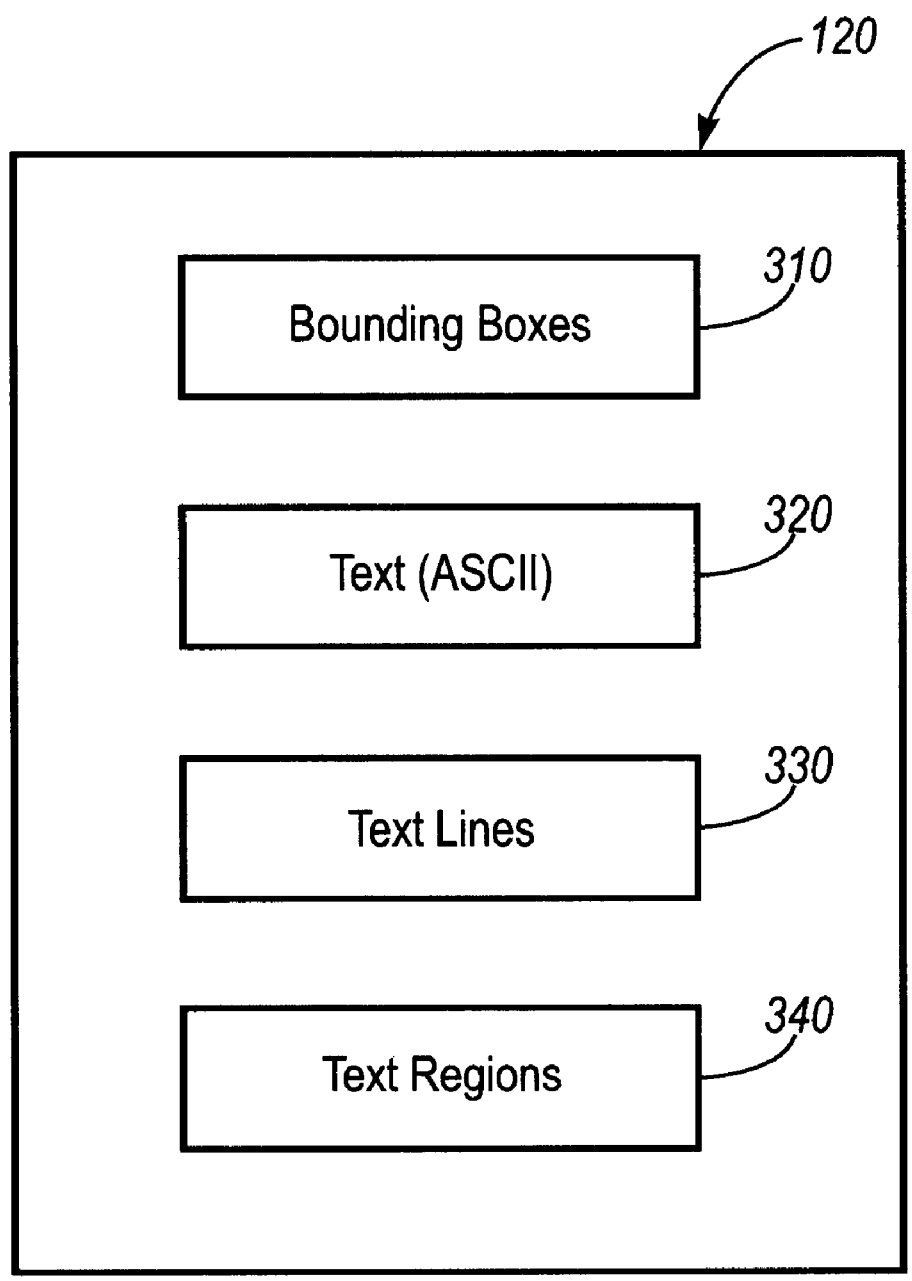
FIG. 3 illustrates a block diagram representing OCR results according to one embodiment of the present invention.

For a preferred embodiment of the present invention a Textbridge OCR engine manufactured by ScanSoft, Inc. is used for performing OCR on the image. FIG. 3 illustrates a block diagram representing the results produced by an OCR engine 120. The OCR results include Bounding Box Information 310, Text Information 320, Text Line Information 330, and Text Region Information 340 according to a preferred embodiment of the present invention. In FIG. 3, OCR engine 120 generates information defining a bounding box for each word, text regions and text lines corresponding to each word, and the recognized characters in each word. According to the preferred embodiment, Text Module 320 uses a coding scheme referred to the American Standard Code for Information Exchange (ASCII), which is used to assign numeric values to letters, numbers, punctuation marks, and certain other characters. In other embodiments, coding schemes other than ASCII may be used. The Textbridge OCR engine saves the OCR results in an XDOC file, which contains both text and formatting information, and stores the XDOC file in a clipboard.

A bounding box refers to the smallest box in image coordinates which contains all characters for one word. FIG. 4 illustrates the bounding boxes corresponding to the text in image 200 (see also FIG. 5, e.g., bounding box 520). More specifically, the rectangle around each word represents a bounding box.

Figure 5:
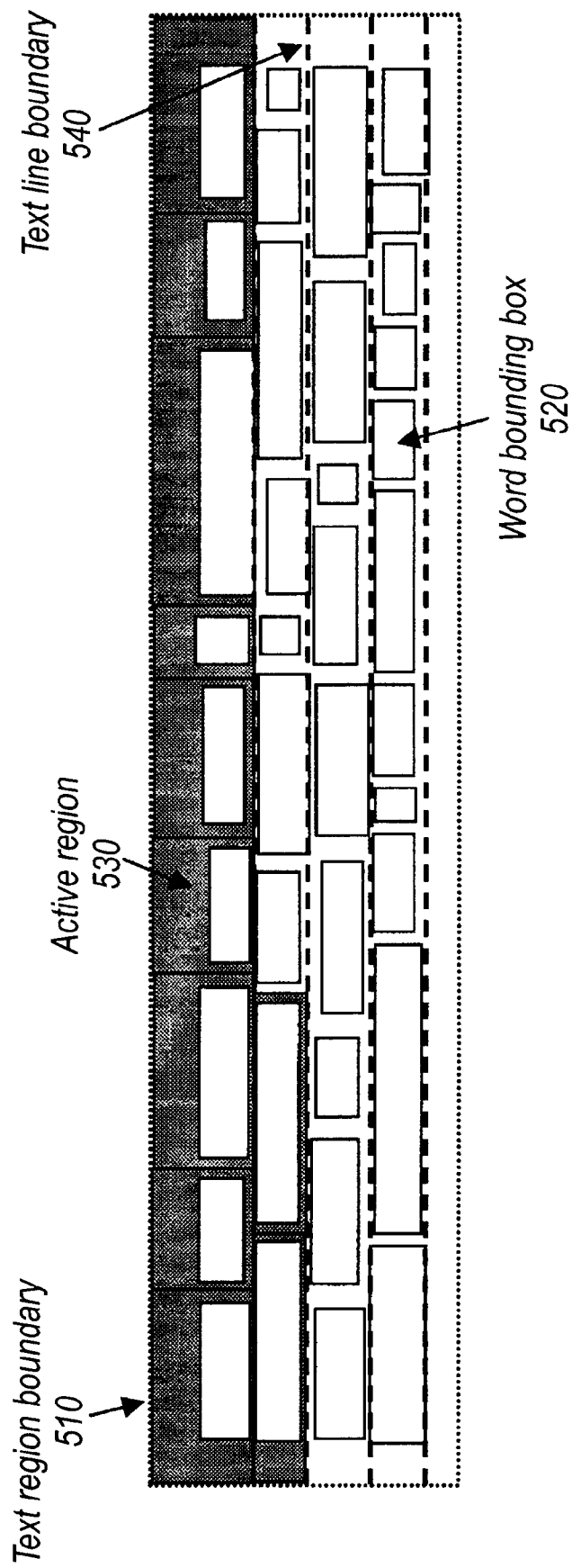
FIG. 5 illustrates examples of word position information and active regions associated with an image.

A text region refers to the areas of text in an image that are grouped together. In other words, each text region represents a block of text, which is not connected to any other block of text. For example, a column of text may represent a text region such that each column in a newspaper article would be classified as a separate text region. Text regions are often rectangular and are defined by a text region boundary. Furthermore, in complicated layouts, text regions may overlap each other. FIG. 5 illustrates the text region boundary 510 corresponding to the text region of image 200. The OCR engine in the preferred embodiment assigns each text region a unique region identification number and determines the text region corresponding to each word.

Each text line includes words, which are in the same text region and for many languages appear horizontally next to each other. Each text line is defined by an upper text line boundary and a lower text line boundary. Text line boundary 540 shown in FIG. 5 illustrates the lower text line boundary for the second text line (which is illustrated by a series of bounding boxes rather than words) of image 200. The OCR engine in the preferred embodiment assigns a line number to each text line in a text region and determines the text line corresponding to each word.

For alternative embodiments, the OCR engine may not generate information defining the text regions and text lines. For such an embodiment, the information relating to text regions and text lines may be computed based on the bounding box information. For example, text regions may be found by clustering all words, which have a lower and upper neighbor, or both within a certain distance. Once the text regions are identified, the text lines may be found by projecting the bounding box centers onto the vertical axis and clustering the points. Each cluster center is then assigned a line number. Words belong to a given line if they fall closest to a horizontal line intersecting a given cluster center.

Referring back to FIG. 1, once the OCR results are obtained, the active regions may be determined as shown by box 130. For one embodiment of the present invention, an active region is defined for each word in the image, such as each word in image 200 as shown in FIG. 2. Each active region represents a plurality of image coordinate points so that given an image coordinate point (e.g., a start point, end point, or other point), a word can be found which is closest to this point. For a preferred embodiment, the point may be designated by a user with a cursor control device, such as a mouse or keyboard.

FIG. 5 illustrates the active regions for the words in the first text line and the first two words in the second text line (e.g., the fourth word in the first line has active region 530). For convenience, only the active regions for some of the words in image 200 shown in FIG. 2 are shown in FIG. 5; however, it should be noted that the active regions for all words in an image are typically determined.

The active regions allow a word in an image to be identified based on a point on or near the word. For example, given a start point and an end point of a selected text region (such as Start Point 1010 and End Point 1020 shown in FIG. 10), the active regions associated with the start and end points are found such that the words closest to the start and end points can be identified. Thus, the designated points (whether or not specified by a user) is used to define the selected text region such that the word selection techniques of the described embodiments can match the OCR results to the selected text region. This allows the appropriate words to be copied into another file.

In general, the active regions are determined by finding divisions between words and between text lines using the information generated during the OCR stage. More specifically, the vertical boundaries of the active regions are determined by finding word divisions, and the horizontal boundaries of the active regions are determined by finding line divisions.

Figure 6:
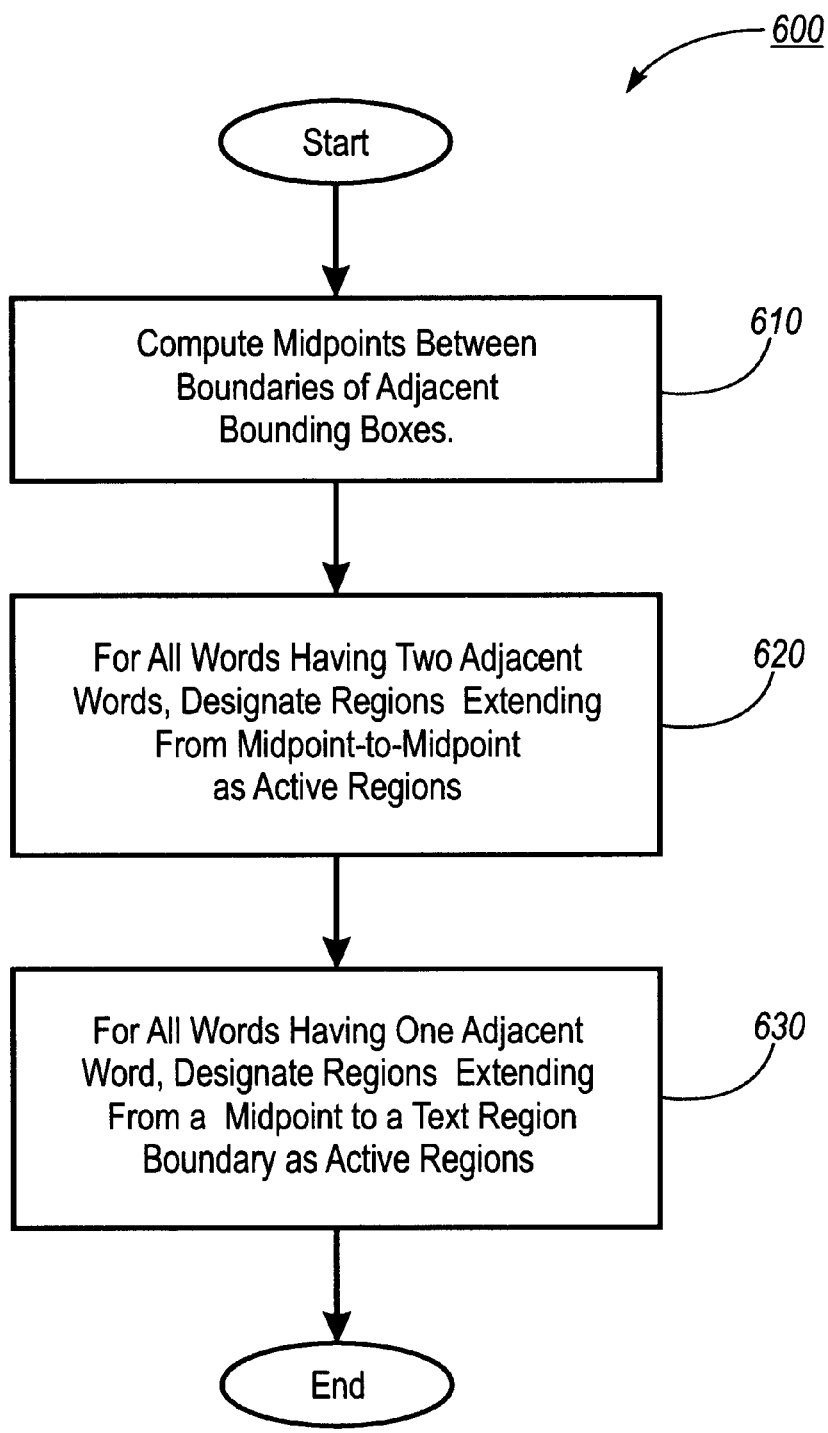
FIG. 6 illustrates a logic flow diagram for determining vertical boundaries of active regions according to one embodiment of the present invention.
Figure 8:
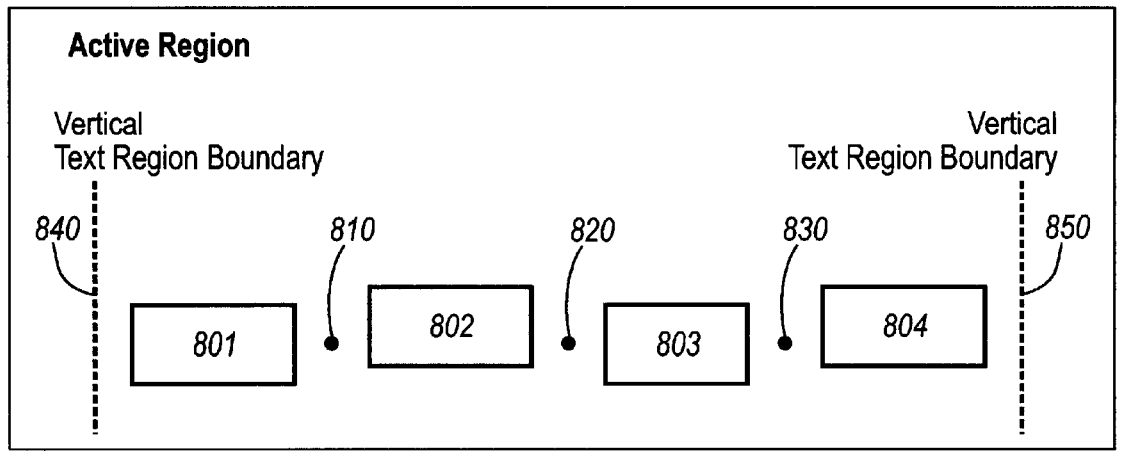
FIG. 8 illustrates an example of vertical boundaries for active regions.

FIG. 6 illustrates a logic flow diagram for determining the vertical boundaries of active regions according to one embodiment of the present invention. In box 610, midpoints between vertical boundaries of adjacent bounding boxes are determined. FIG. 8 illustrates a word line having four bounding boxes 801–804. Midpoints 810, 820 and 830 represent examples of midpoints between vertical boundaries of adjacent bounding boxes.

For each word having two adjacent words (also referred to as "center word"), the region extending from the midpoint on its left side to the midpoint on its right side is designated as the active region, as shown in box 620. Thus, the midpoint on the left side and the midpoint on the right side represent the vertical boundaries of the active regions for center words.

For each word having one adjacent word (also referred to as a "side word"), the region extending from the midpoint on its right side to the text region boundary on its left side, or the midpoint on its left side to the text region boundary on its right side is designated as the active region, as shown in box 630. For example, in FIG. 8, the vertical active region boundaries for Bounding Box 801 extend from Vertical Text Region Boundary 840 to Midpoint 810, and the vertical active region boundaries for Bounding Box 804 extend from Vertical Text Region Boundary 850 to Midpoint 830.

In the event that there is only one word in a text line, then the active region extends between the two vertical boundaries of the text region.

Figure 7:
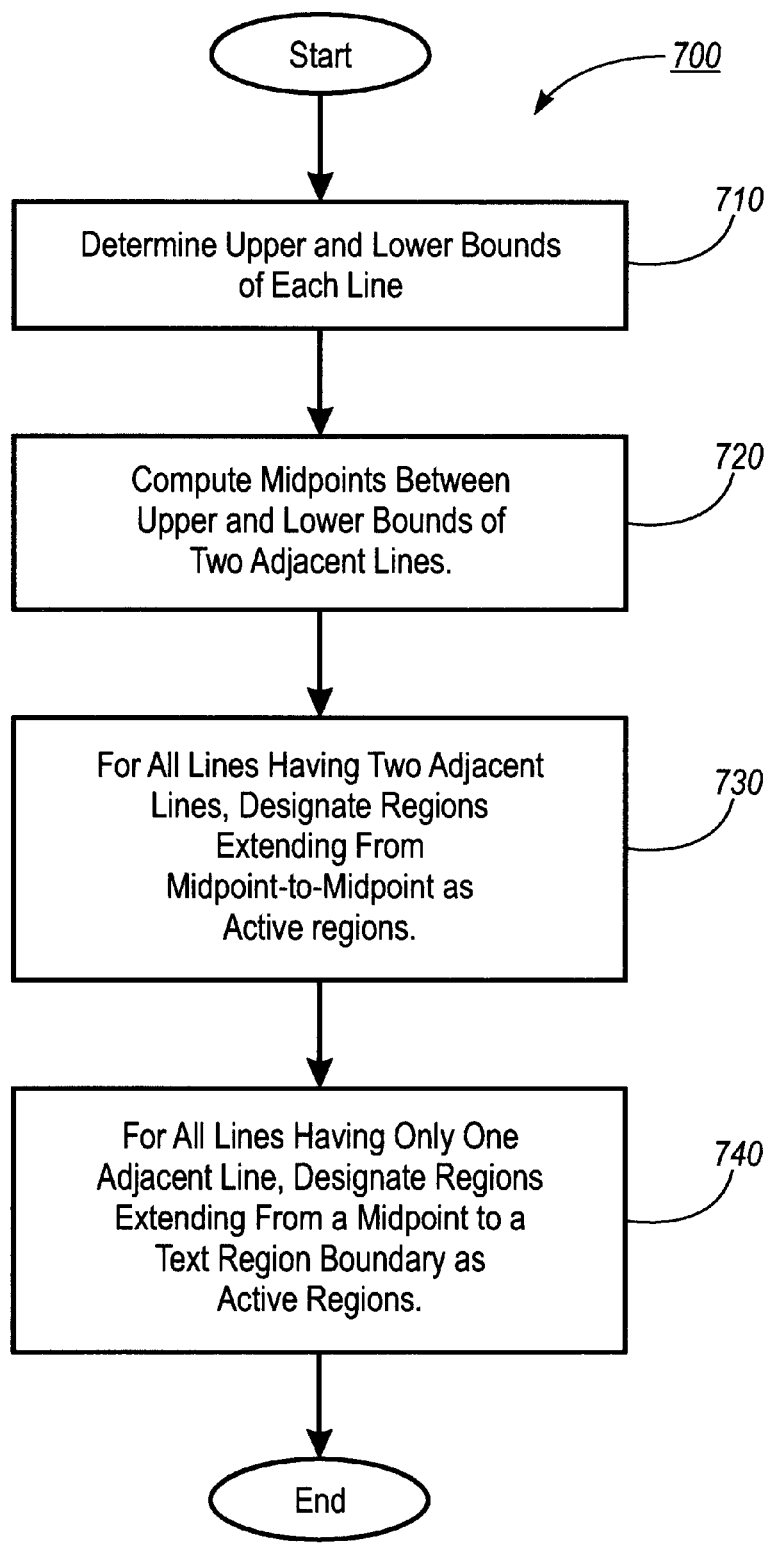
FIG. 7 illustrates a logic flow diagram for determining horizontal boundaries of active regions according to one embodiment of the present invention.

FIG. 7 illustrates a logic flow diagram for determining the horizontal boundaries of active regions according to one embodiment of the present invention. In box 710, the upper and lower bounds of each text line are determined. For one embodiment of the present invention, the upper bound of a text line is defined as the uppermost point of any bounding box in that particular text line and similarly, the lower bound of a text line is defined as the lowermost point of any bounding box in that particular text line.

Figure 9:
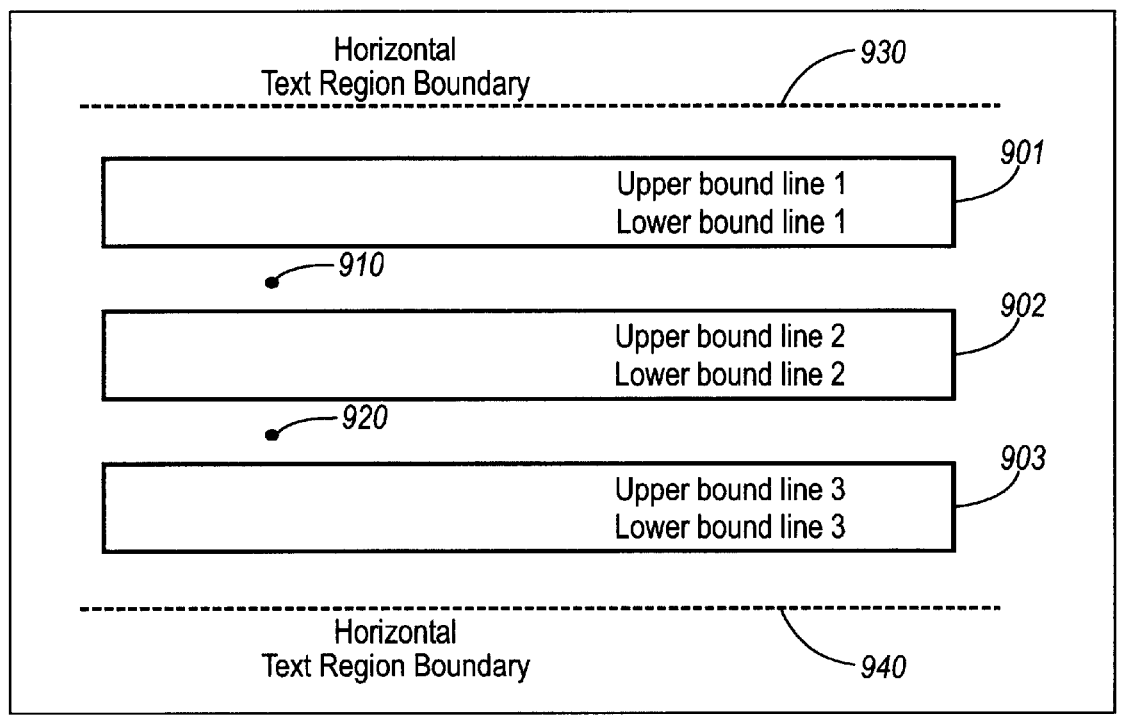
FIG. 9 illustrates an example of horizontal boundaries for active regions.

In box 720, the midpoints between the upper and lower bounds of adjacent text lines are computed. For example, FIG. 9 illustrates three text lines 901–903. Midpoint 910 represents the midpoint between Text Lines 901 and 902 and Midpoint 920 represents the midpoint between Text Lines 902 and 903.

Referring back to FIG. 7, in boxes 730 and 740, the horizontal boundaries of the active regions are determined. In box 730, the horizontal boundaries of the active regions are determined for text lines having two adjacent text lines (also referred to as "center text lines"). The horizontal boundary for the active regions of a center text line extends from an upper midpoint to a lower midpoint. For example Midpoint 910 to Midpoint 920 shown in FIG. 9 represent the horizontal boundaries for Text Line 902. It should be noted that all active regions within a particular text line have the same horizontal active region boundaries.

Referring back to FIG. 7, in box 740, the horizontal boundaries of the active regions are determined for text lines having only one adjacent text line (also referred to as "side text lines". The horizontal boundary for the active regions of a side text line extends from a text region boundary to a midpoint. For example, as shown in FIG. 9, the horizontal boundaries for the active regions within Text Line 901 extend from Horizontal Text Region Boundary 930 to Midpoint 910 and the horizontal boundaries for the active regions within Text Line 903 extend from Horizontal Text Region Boundary 940 to Midpoint 920.

In the event that there is only one text line in an image, then the horizontal boundaries of the active region extend from the boundaries of its corresponding text region.

Each word in an image has a corresponding active region. For one embodiment of the present invention, the boundaries of the active regions are determined in accordance with logic flow diagrams 600 and 700.

For alternative embodiments of the present invention, the line and word divisions (i.e.,horizontal and vertical boundary determinations) may be performed in a manner more adaptive to context. For example, the line division may be determined by taking into account whether the characters are ascenders or decenders, and the word division may take into account a hyphenated word. An ascender refers to that portion of a lower case letter that rises above the main body of the letter and a descender refers to that portion of a lower case letter that falls below the baseline. Line division may also take into account the presence of drop capitals that commonly occur at the start of articles.

In yet other embodiments of the present invention, the active regions may be arranged in some other manner. For example, rather then selecting a word closest to the selected point, the word to the left of the selected points is selected. This can be accomplished by aligning the active regions with the left side of the bounding boxes.

It should also be noted that the OCR results (and additional information) may be stored in a file or in a memory along with the bitmap image so that word-to-word selection may be performed at a later time without recomputing the OCR results.

Once the active regions associated are determined, then a selected text region may be identified as shown in box 140 in FIG. 1 upon the designation of the selected text region either by a user, semi-automatically, or automatically. The selected text region may be designated by specifying one or more points (e.g., start and end points).

For a preferred embodiment of the present invention, an image (or any representation of the image) is displayed (box 151) and a user specifies start and end points (box 152) to designate the selected text region with a cursor control device such as a mouse, keyboard, etc. Each of the designated points falls within an active region, which has a corresponding word. The word identified by the start point is referred to as a first word in the selected text region and the word identified by the end point is referred to as a last word in the selected text region.

The image may be displayed to the user in various forms such as the original image captured by an image capture device, an enhanced image of the original image, a binarized version of the original image, a rendered version of the OCR text which closely resembles the original image, a version which shows regions or augments the image with any other useful information, etc.

When specifying the start and end points, the user may use a mouse to click on a start point (to designate the start point) and drag the mouse pointer to an end point at which time the mouse button is released (to designate an end point). Alternatively, the user may use a mouse to click on the start point and then click on the end point.

Figure 10:
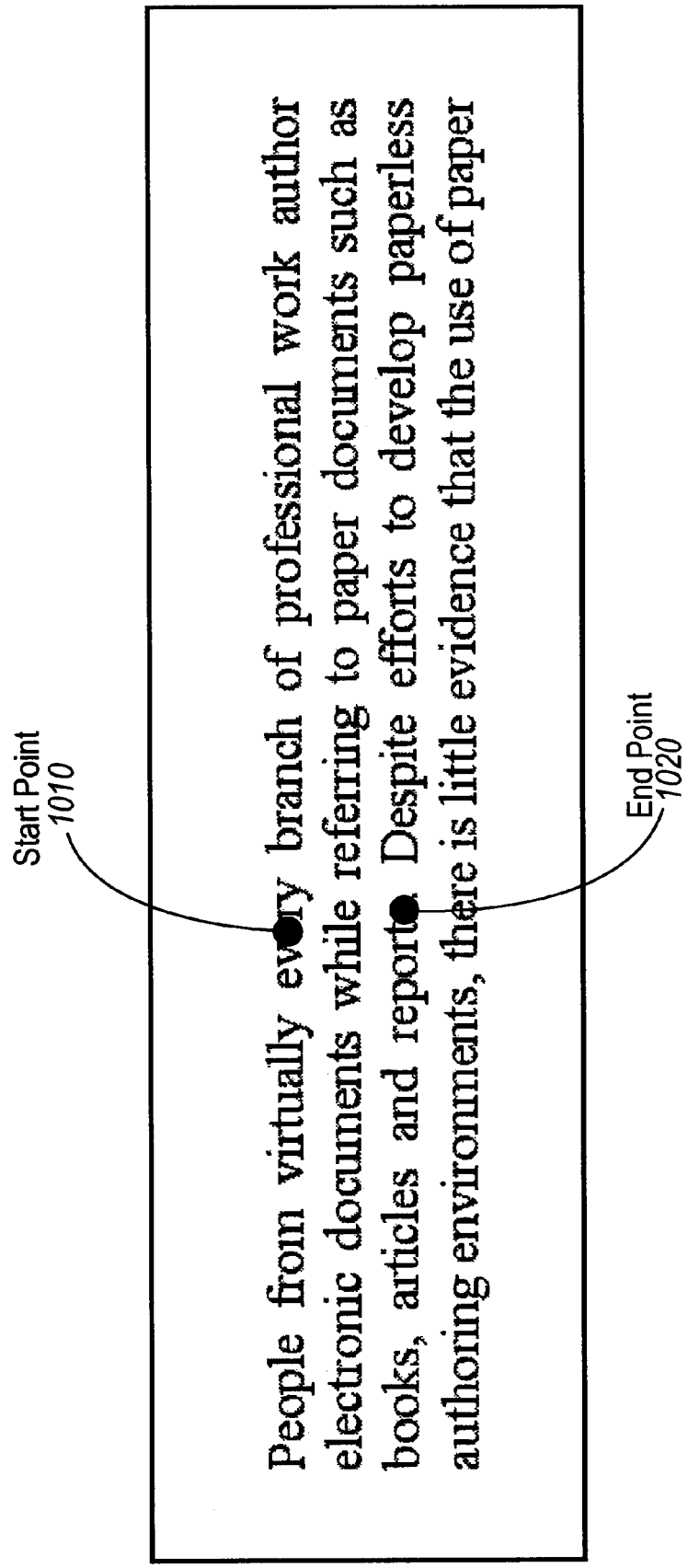
FIG. 10 illustrates an example of designated start and end points for an image.

FIG. 10 illustrates start point 1010 and end point 1020. The start point 1010 falls within the active region corresponding to the word "every" and the end point 1020 falls within the active region corresponding to the word "reports". Based on the start point 1010 and end point 1020, the active regions associated with the start and end points are identified. For one embodiment of the present invention, a look up table (LUT) may be used to map the display coordinates of the designated points (e.g., start and end points) to its corresponding active regions. Each active region may be represented by a plurality of coordinate points. Based upon these active regions, the word "every" is identified as the first word in the selected text region and the word "reports" is identified as the last word in the selected text region.

In other embodiments of the present invention, the start and end points may be determined semi-automatically or automatically, rather than having the user select these points with some sort of cursor control device or other type of selection device. The start and end points may be selected automatically without any user input or semi-automatically with only a start point or other point selected by the user. Examples of semi-automatic selection include having the user select a start point and then automatically selecting the rest of the sentence, or having the user double click anywhere in a paragraph and then selecting the entire paragraph. Examples of automatic selection include selecting all word or phrases that fall into a certain class (e.g., names, email addresses, hyperlinks, etc or selecting all words matching a given input word).

For alternative embodiments, a user may perform multiple text selections by pressing an additional key on the keyboard (e.g., CTRL or shift). Also, in a similar manner, it is possible to combine text selections or merge them and remove words from existing words. Furthermore, text selections may take into account more complicated layouts (e.g., tables which include table cells, rows and columns) and formatting information (e.g., as would be needed to select cells, columns, and rows in a table).

Once the start and end points are designated (whether by the user, semiautomatically, or automatically), the first and last words in the selected text region are identified. Using the first and last words in the selected text region, all other words falling within the selected text region as are identified, as shown in box 160 in FIG. 1.

Figure 14:
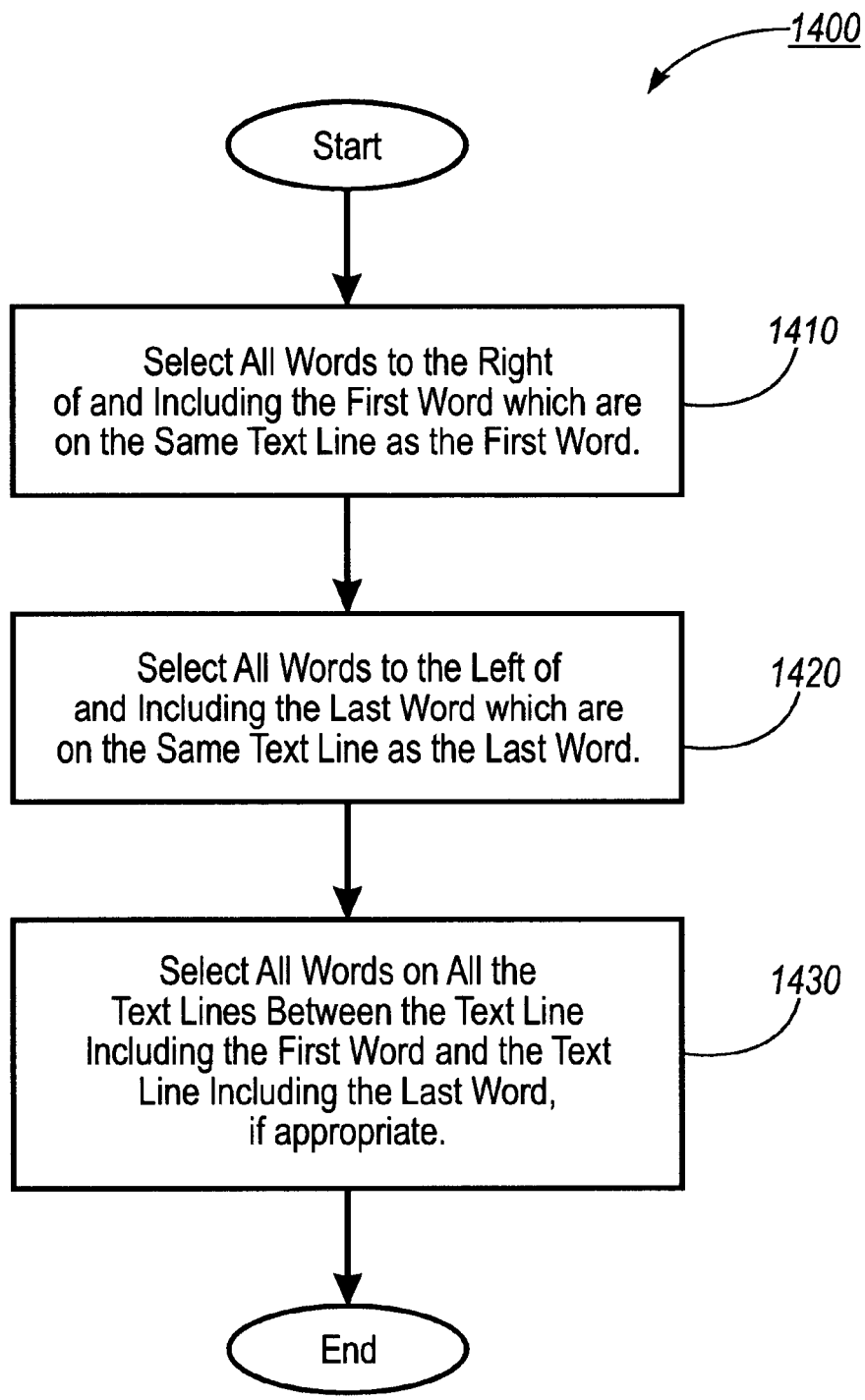
FIG. 14 illustrates a logic flow diagram for identifying all words in a selected text region according to one embodiment of the present invention.

For one embodiment of the present invention, all words within the selected text region are identified according to the logic flow diagram 1400 shown in FIG. 14. In box 1410 all words to the right of and including the first word which are on the same text line as the first word are selected. In box 1420, all words to the left of and including the last word which are on the same text line as the last word are selected. In box 1430, all words on all lines between the first word and the last word are selected.

Figure 11:
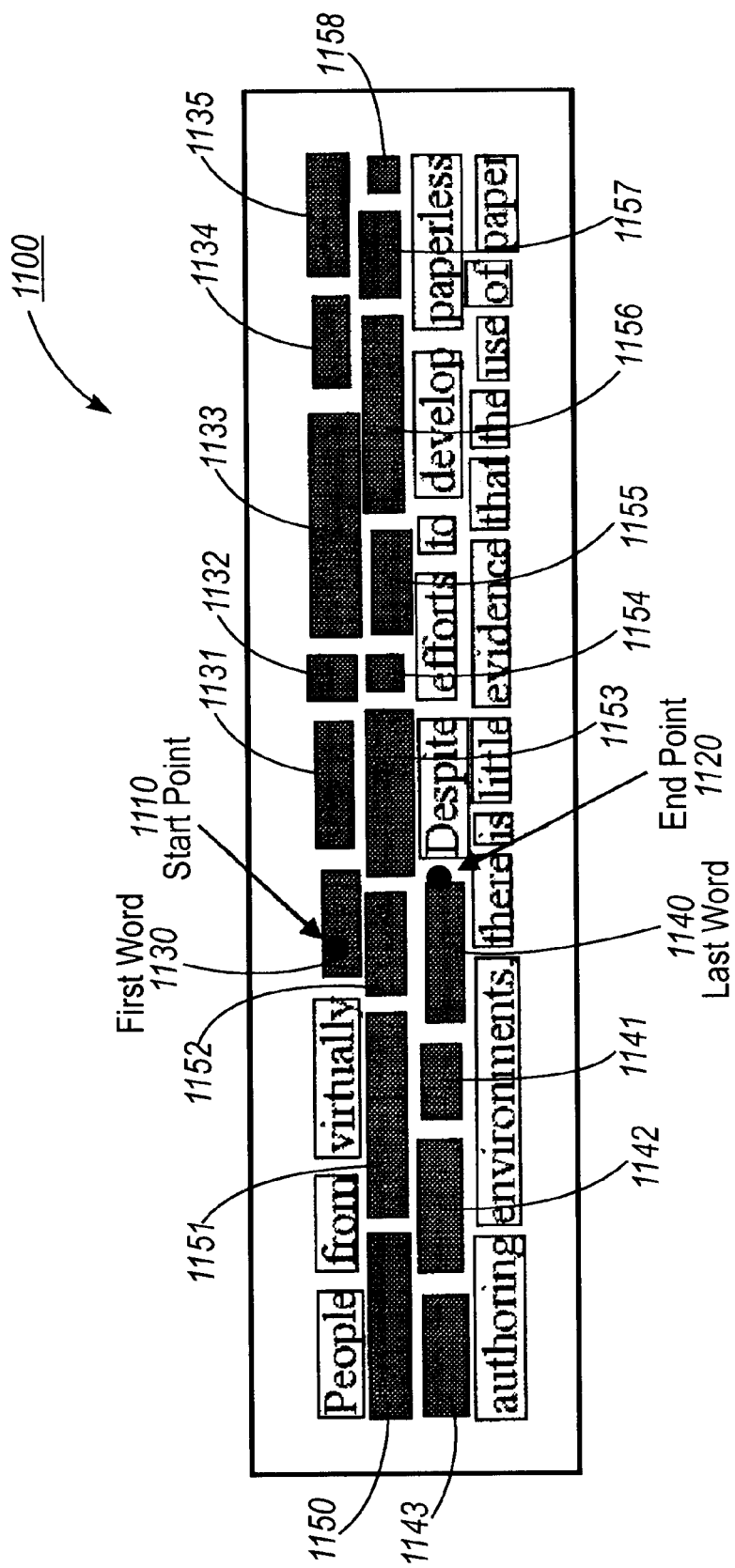
FIG. 11 illustrates an example of identifying all words in a selected text region.
Figure 12:
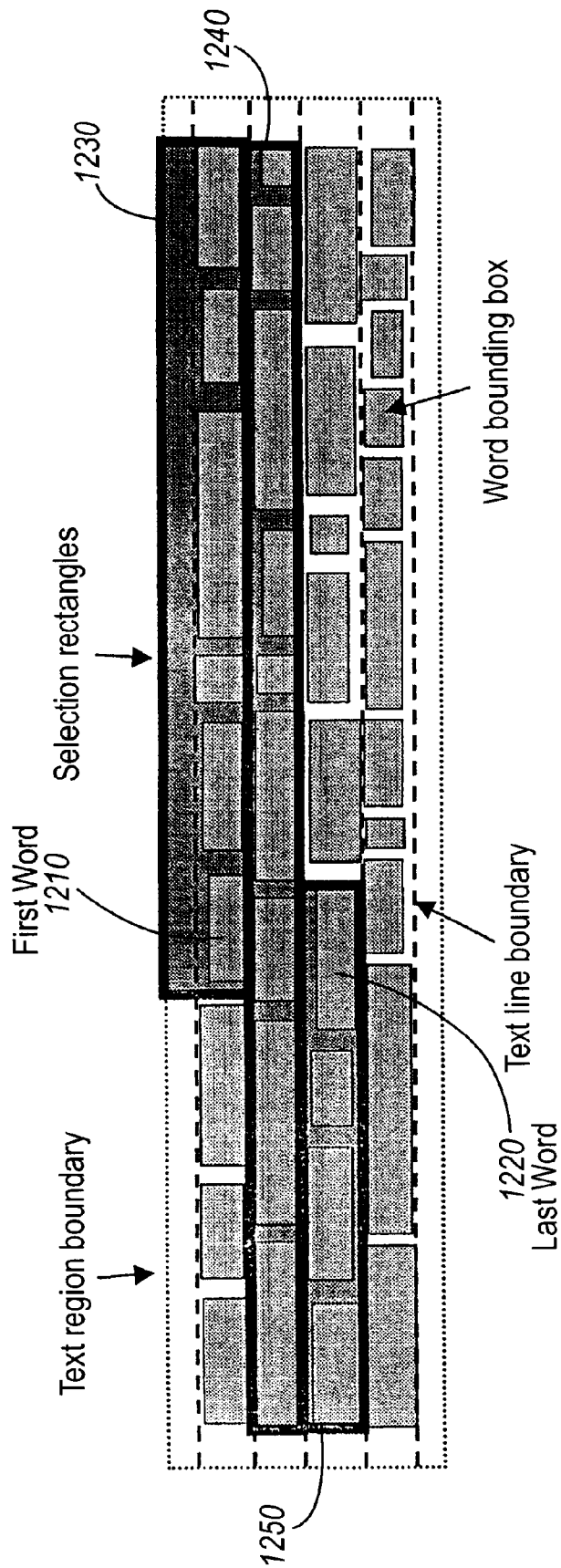
FIG. 12 illustrates an example defining rectangles for generating a selected word region.

FIG. 11 illustrates an example of identifying all words in a selected text region 1100 once first and last words are identified. Word 1130 represents a first word and Word 1140 represents a last word. All words to the right of Word 1130 in line 1 (i.e., Words 1131–1135) are selected. All words to the left of Word 1140 in line 3 (i.e., Words 1140–1143) are selected. All words on line 2 are selected (i.e., Words 1150–1158).

Figure 15:
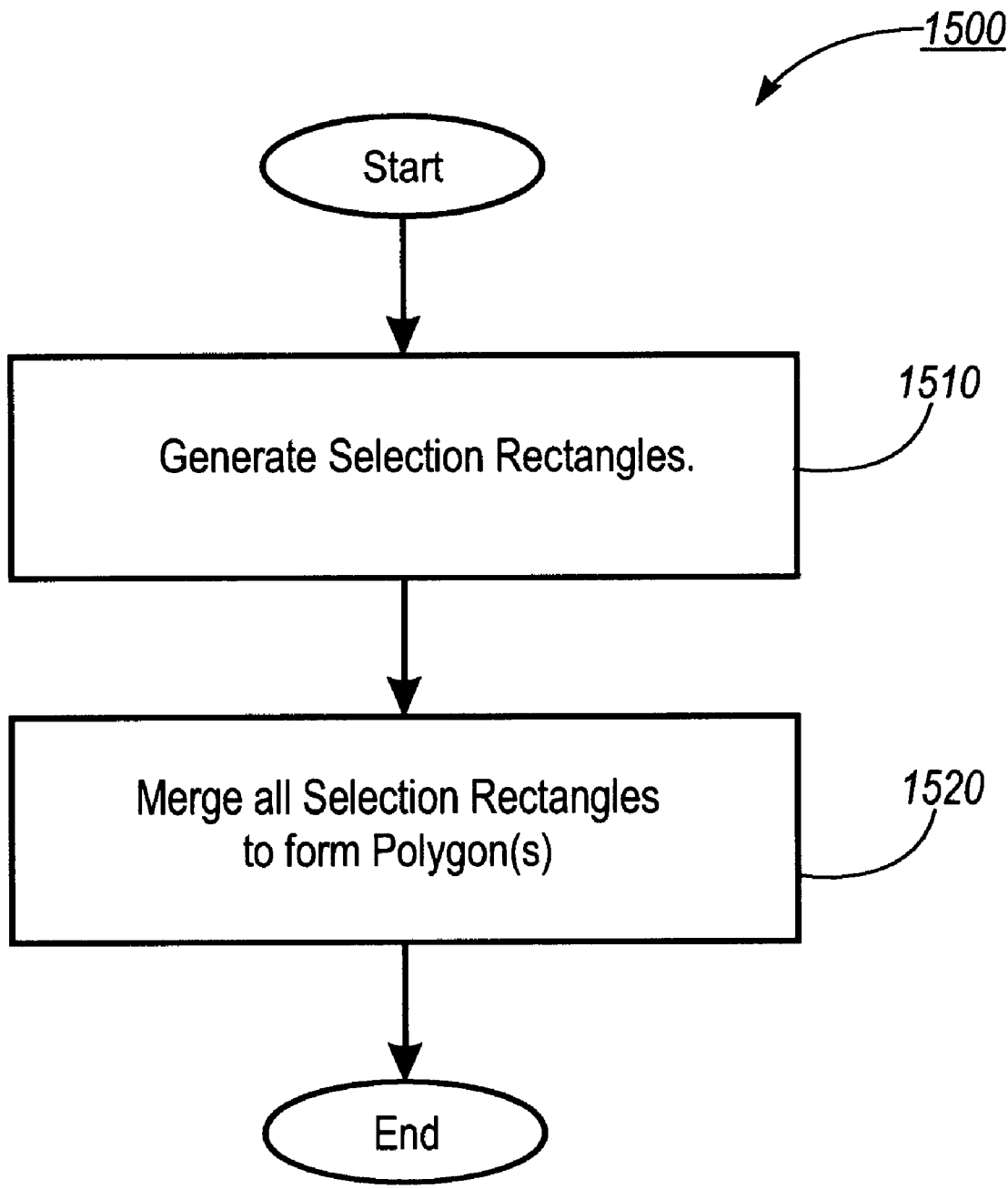
FIG. 15 illustrates a logic flow diagram for generating a selected word region according to one embodiment of the present invention.

Referring back to FIG. 1, an image of the selected word region is generated in box 170. For one embodiment of the present invention, the selected word region is generated in accordance with logic flow diagram 1500 shown in FIG. 15.

In box 1510, a selection rectangle for each line of text which contains one or more selected words is generated. The top and bottom boundaries of each selection rectangle is identical to that of the upper and lower boundaries of the active regions within the same text line. The left and right boundaries of the selection rectangles are determined by the left side of the first selected word (e.g., Word 1210) bounding box and the right side of the last selected word (e.g., Word 1220) bounding box.

Figure 13:
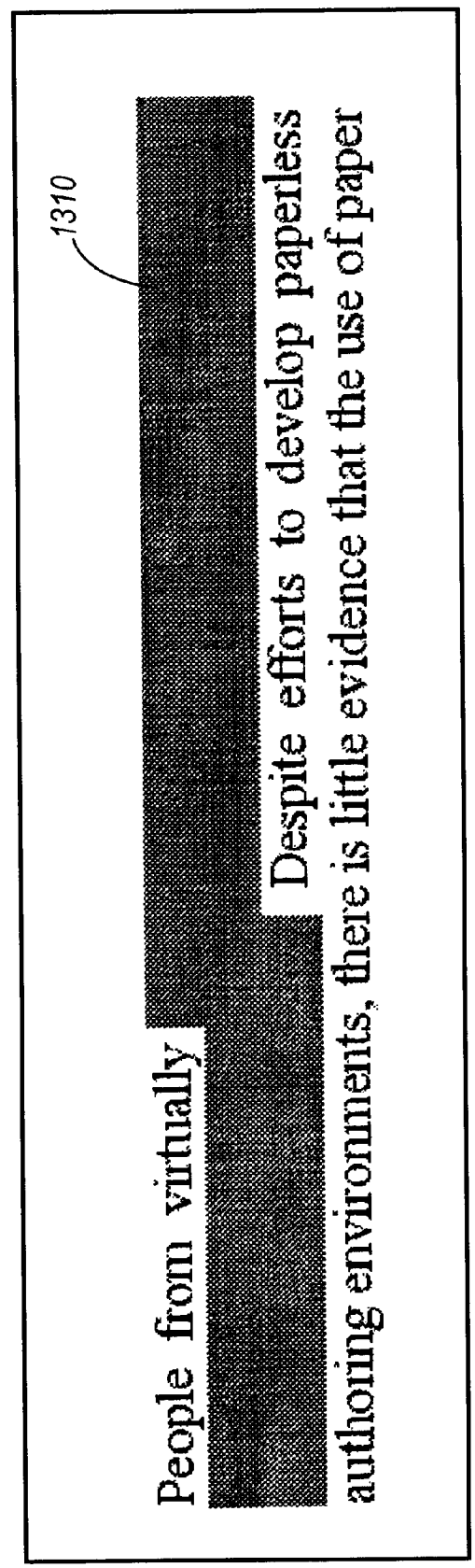
FIG. 13 illustrates an example of defining a polygon for generating a selected word region.

In box 1520, the selection rectangles are merged into one or more polygons. For example, Selection Rectangles 1230, 1240, and 1250 are merged into Polygon 1310 shown in FIG. 13. The polygon(s) represent the selected word region.

Once the selected word region is generated, the selected word region can be displayed as shown in FIG. 19. For a preferred embodiment of the present invention, the selected word region appears automatically and is redrawn as the user moves the mouse pointer. When displaying the selected word region, the polygon region(s) are displayed along with some interpretation of the image. For example, a rendered version of the OCR'ed text corresponding to the polygon region may be displayed. Or, alternatively, an image having multiple bits-per-pixel (e.g., a grey-scale image or a color image), a binary image, etc. may be displayed. In a preferred embodiment of the present invention, the selected word region is displayed as a reverse video region.

In addition to displaying the selected word region, the selected word region may be saved in a clipboard and subsequently transferred to an application program (by a "cut-and-paste" or "copy-and-paste" operations) such as various word processing applications. When copying to a Microsoft WINDOWS® clipboard, a rendered version of the ASCII text is used. Furthermore, the selected word region may be stored in a memory device.

It should be noted that more than one text selection may be performed on an image after determining the active regions for that image without the need to recompute the bounding box information, text line information, text region information, position and extent of the active regions, and the image warp. Another selection can be made by repeating the functions performed in boxes 140, 150, 160, 170, and 180 as shown by arrow 190.

For an alternative embodiment of the present invention, word selection may be performed on warped images, which are skewed (see example image 1700 FIG. 17) or warped by page curvature, perspective effects (see example image 1600 FIG. 16) or barrel distortion. The ability to perform word/text selection on a warped image is particularly useful when using a video camera as the image capture devices. Perspective distortion, barrel distortion and skew are often prevalent in camera images obtained by "over-the-desk" scanning systems.

Figure 18:
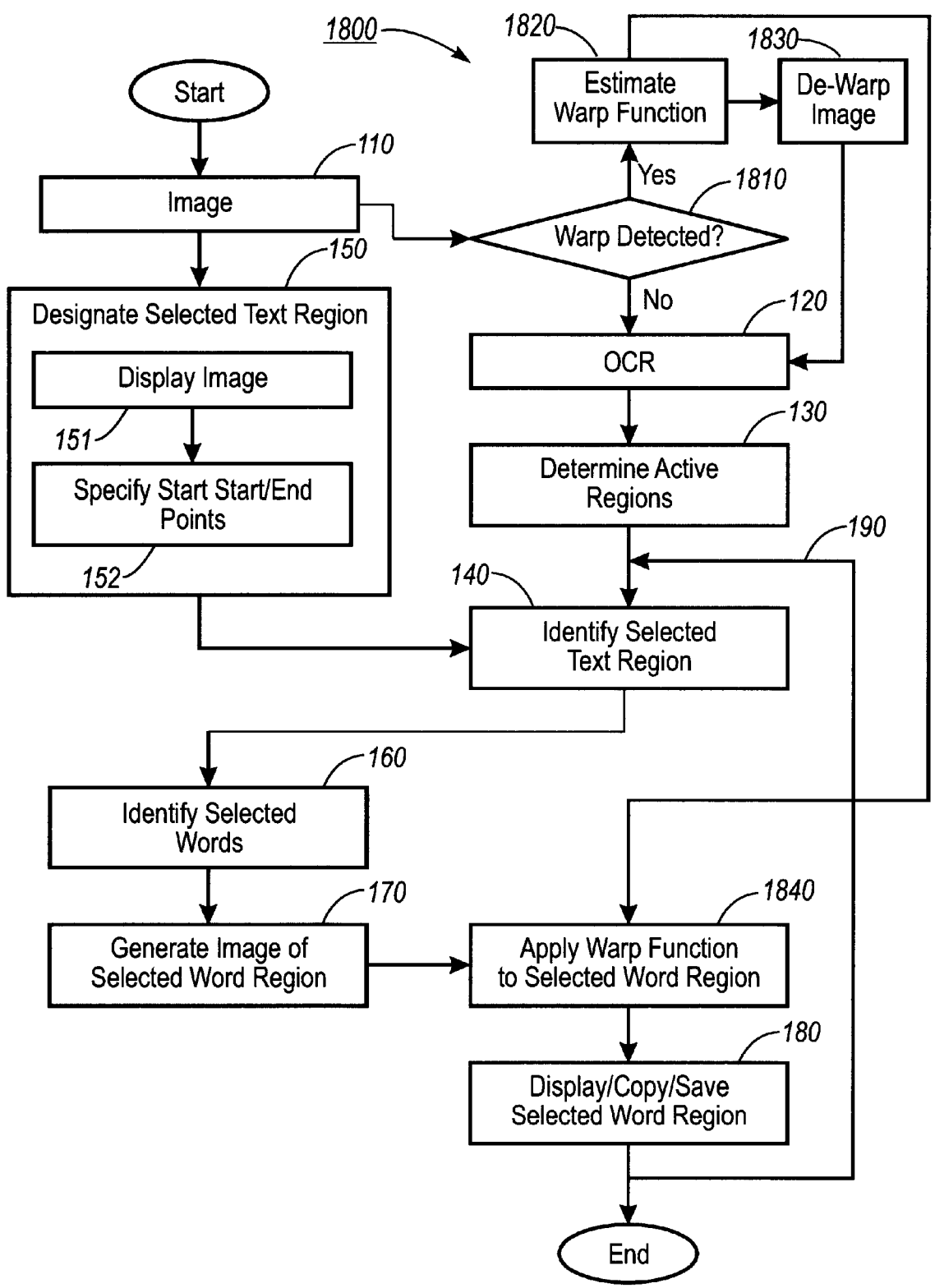
FIG. 18 illustrates a logic flow diagram for word selection from an image, which may be warped according to one embodiment of the present invention.

FIG. 18 illustrates a logic flow diagram 1800 for performing text selection on warped images. When performing word or text selection on a warped image, additional steps may be performed, such as those illustrated in boxes 1810, 1820, 1830, and 1840. It should be noted that several of the boxes in FIG. 18 correspond to boxes shown in FIG. 1 and therefore the discussion above with respect to these boxes will not be discussed further here.

Prior to OCR (box 120), warp in an image may be detected (as shown in decision box 1810). If warp in the image is detected, then the warp may be corrected (as shown in box 1830) prior to OCR by applying a warp function estimated in box 1820.

For one embodiment of the present invention, the warp of an image can be described by some function W that maps points q in the dewarped image D, to points p in the observed image O. The observed image O may represent the image recorded by a camera or captured by another image capture device. Usually, the warp is parameterised by a set of parameters a: thus, p=W(q,a). For example, to describe a skewed page a can be chosen to consist of just one parameter, giving the rotation of the text lines about the image horizontal. For another example, to describe perspective for a flat page a can be chosen to be three parameters describing the rotation of the page about three orthogonal axes relative to the camera's optical axis. More general perspective situations require further parameters to describe the distance of the page along the optical axis, the optical centre and the camera focal length. To dewarp an observed image O with grey value (or color value) O(p) at point p, we construct the image D with grey value (or color value) D(q)=O(W(q,a)).

In the common situation where W(q,a) does not appear on the pixel lattice of O, we may take the closest lattice point to W(q,a). Alternatively, we may interpolate grey values of lattice points in the vicinity of W(q,a).

The parameters of the warp function are estimated in box 1820. The warp function maps the coordinates of the input image to the coordinates of the output image so given a point (x,y) in the input image, the corresponding coordinates in the output image (x', y') are x'=a(x,y) and y'=b(x,y). For one embodiment of the present invention, a warped image (i.e., due to skew) is de-warped by rotating the image by angle alpha (single parameter a) such that the coordinates of a point p(x,y) are mapped to a point q(x', y') as follows:

$$x' = x\cos(\text{alpha}) - y\sin(\text{alpha})$$

$$y' = x\sin(\text{alpha}) + y\cos(\text{alpha}).$$

For alternative embodiments, other warp functions well known to those skilled in the arts may be used.

The warp function, which is estimated in box 1820, is eventually applied to the selected word region in box 1840. It should be noted that the selected word region was selected from the de-warped image. To make sure that this selection matches the original warped image in which the start and end points were selected, the selected word region is then warped by applying the warp function generated in box 1820.

On the other hand, if no warp in the image is detected in box 1810, then box 1830 is bypassed such that OCR may be performed on the image without dewarping the image.

Figure 20:
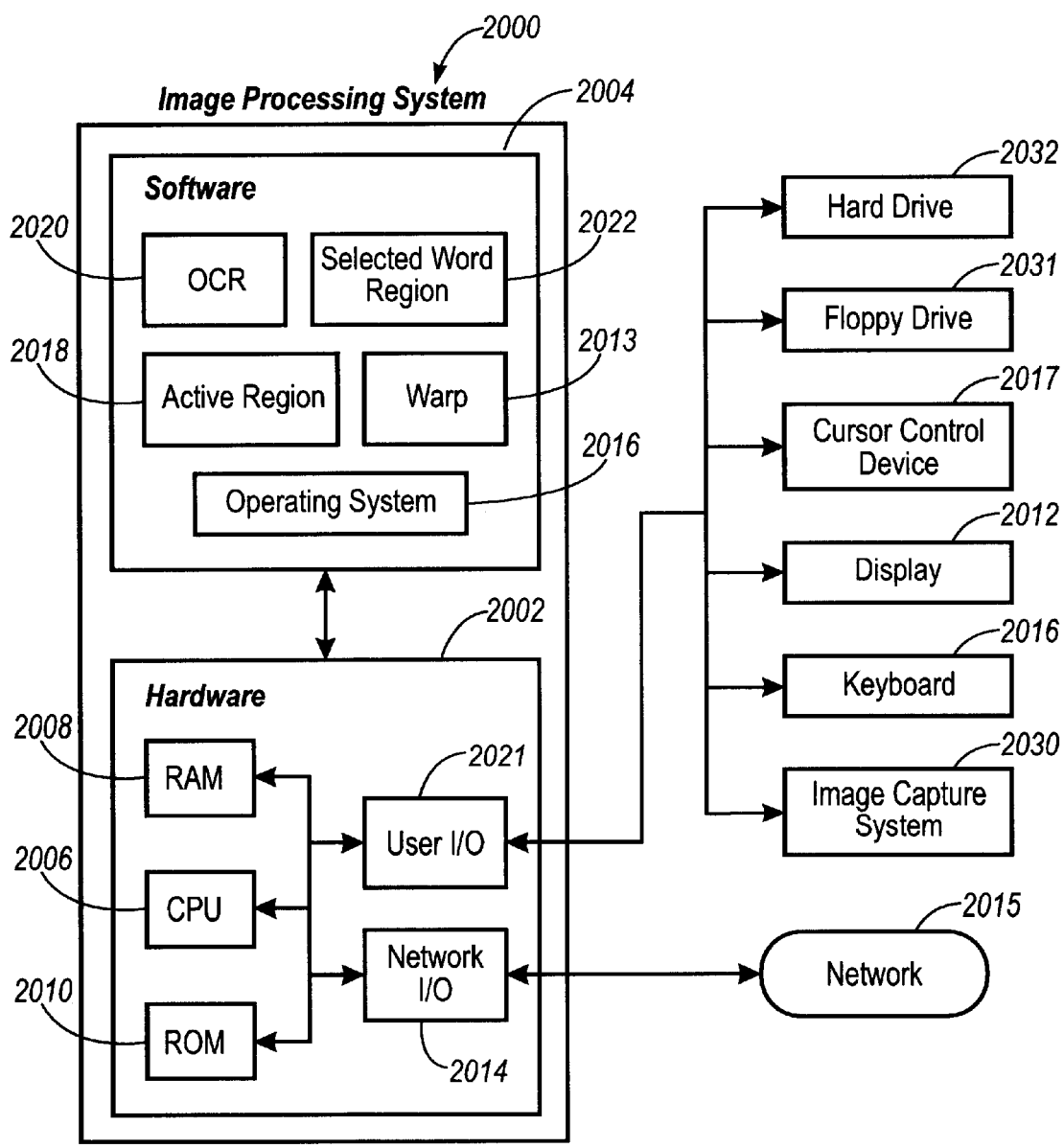
FIG. 20 illustrates a block diagram of an image processing system according to one embodiment of the present invention.

FIG. 20 illustrates an example of an Image Processing System 2000 used to perform the text selection techniques in accordance with the described embodiments. For one embodiment of the present invention, Image Processing System 2000 may be a computer system, which includes Software Components 2004 and Hardware Components 2002. The computer system can be a personal computer, workstation, etc. In a preferred embodiment, the invention is implemented in C++ on an IBM compatible PC running WINDOWS® NT.

The Hardware Components 2002 include a Processing Unit (i.e., CPU) 2006, Random Access Memory (RAM) 2008, Read Only Memory (ROM) 2010, User Input/Output ("I/O") 2021, and Network I/O 2014. The User I/O 2021 may be coupled to various input and output devices, such as a Keyboard 2016, a Cursor Control Device 2017 (e.g., pointing stick, mouse, etc.), a Display 2012, a Floppy Disk 2031 a Disk Drive 2032, etc.

RAM 2008 is used by CPU 2006 as a general storage area and as scratchpad memory, and can also be used to store downloaded image data (e.g., multiple bit-per-pixel image data, binary image data, rendered version of the text image data, etc) for display on Display 2012. Additionally, the clipboard may be a designated are in RAM 2008. ROM 2010 can be used to store instructions executed by CPU 2006.

Display 2012 is an output device that displays image data provided by CPU 2006 or other components in Image Processing System 2000. In the described embodiments, Display 2012 is a raster device representing a rectangular grid of pixels which displays images on a screen, as is well known to those skilled in the art. That is, a bitmap can be input to Display 2010 and the bits of bitmap can be displayed as pixels. An input pixmap can be directly displayed on Display 2010, or components of Image Processing System 2000 can first render codes or other image descriptions from a page description file into bitmaps and send those bitmaps to be displayed on display 2012, as is also well known. Displays such as CRTs, LCD, etc. are suitable for the present invention.

Additionally, User I/O 2021 may be coupled to an Image Capture System 2030 such as a camera system, scanning devices (e.g., flat-bed or hand-held scanners) or other device for capturing images of hardcopy documents.

Furthermore, User I/O 2012 may be coupled to a Floppy Disk 2031 and/or a Hard Disk Drive 2032 to store image data. Other storage devices such as nonvolatile memory (e.g., flash memory), PC-data cards, or the like, can also be used to store data used by Image Processing System 2000.

The Network I/O 2014 provides a communications gateway to a Network 2015 such as a LAN, WAN, the internet, etc. The Network I/O 2014 is used to send and receive data over a Network 2015 connected to one or more computer systems or peripheral devices (such as Image Capture System 2030).

The Software Components 2004 includes an Operating System Software 2016, an OCR Module 2020, an Active Region Module 2018, a Warp Module 2013 and a Selected Word Region Module 2022. The Operating System Software 2016 may represent an MS-DOS, the Macintosh OS, OS/2, WINDOWS®, WINDOWS® NT, or Unix operating systems or other known operating systems. OCR Module 2020 converts the pixmap image representation into a text image representation, which also includes word position information. The Active Region Module 2018 determines an active region corresponding to each word in the text image. Selected Word Region Module 2022 generates the selected word region by matching the designated start and/or end points to the OCRed results.

For various embodiments of the present invention, Image Processing System 2000 is a general purpose computer that can be implemented by any one of a plurality of configurations. For example, Processor 2006 may in alternative embodiments, be defined by a collection of microprocessors configured for multiprocessing. In yet other embodiments, the functions provided by Software Components 2004 may be distributed across multiple computing devices (such as computers and peripheral devices) acting together as a single processing unit. Furthermore, one or more aspects of Software Components 2004 may be implemented in hardware, rather than software. For other alternative embodiments, Image Processing System 2000 may be implemented by data processing devices other than a general purpose computer. For example, the text selection techniques of the described embodiments may be implemented in hardware and/or software in a portable device, such as a document camera.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of selecting a text region from an image, comprising:
   (a) accessing from a memory device character and formatting information for each word in the image; the formatting information including word bounding box, text line boundary, and text region boundary information;
   (b) determining an active region associated with each word in the image based on the character and formatting information; the active regions identifying regions in the image between word bounding boxes, text line boundaries, and text region boundaries within text regions of the image;

(c) identifying a first word and a last word in a selected text region based on at least one active region associated with at least one word within the selected text region; and (d) identifying all words within the selected text region based on the first and last words in the selected text region.

2. The method of claim 1, comprising, prior to (a):

(e) generating the character information from image data for each word in the image;

(f) determining the formatting information for each word in the image; and (g) storing the character and formatting information for each word in the image in the memory device.

3. The method of claim 1, wherein (c) comprises identifying the first and last words based on a first active region and a second active region, the first active region associated with the first word in the selected text region and the second active region associated with the last word in the selected text region.

4. The method of claim 1, further comprising (e) determining formatting Information for each word in the image by determining word bounding box, text line boundary, and text region boundary information for each word in the image; and wherein (c) comprises:

(c1) determining boundaries of the active region for each of the words based upon at least the word bounding box and one of the text line boundary and the text region boundary information for each of the words;

(c2) matching at least one designated image coordinate point to an image coordinate point associated with the at least one active region;

wherein each active region determined for each word in the Image represents a plurality of image coordinate points.

5. The method of claim 1, comprising after (b):

(e) displaying the image;

(f) receiving user input designating at least one image coordinate point within the selected text region; and (g) identifying the at least one active region associated with the at least one image coordinate point designated by the user;

wherein each active region determined for each word in the image represents a plurality of image coordinate points.

6. The method of claim 1, further comprising:

(e) performing optical character recognition (OCR) on the image to generate OCR results, the OCR results including text and formatting information for each word in the image;

(f) generating an image of the selected text region based on the character information and the formatting information for each word within the selected text region; and (g) displaying the image of the selected text region.

7. The method of claim 1, further comprising:

(e) storing the text contained within the selected text region in a clipboard; and (f) transferring the text stored in the clipboard to an application program.

8. The method of claim 1, further comprising:

(e) copying the text contained within the selected text region to an application program.

9. The method of claim 2, further comprising, prior to (e):

(h) determining that the image is warped;

(i) estimating a warp function; and (j) applying the warp function to the image to dewarp the image.

10. The method of claim 9, further comprising, after (d):

(k) applying the warp function to an image of the selected text region to warp an image of the selected text region.

11. The method of claim 1, further comprising repeating steps (c) and (d).

12. The method of claim 7, further comprising repeating steps (c) through (f).

13. The method of claim 8, further comprising repeating steps (c) through (e).

14. A method of selecting a text region from an image, comprising:

(a) performing optical character recognition (OCR) on the image to generate OCR results, the OCR results including text and formatting information for each word in the image; the formatting information including word bounding box, text line boundary, and text region boundary information;

(b) determining an active region associated with each word in the image based on the OCR results; the active regions identifying regions in the image between word bounding boxes text line boundaries, and text region boundaries within text regions of the image;

(c) identifying a first word and a last word in a selected text region based on at least one active region associated with at least one word within the selected text region; and (d) identifying all words within the selected text region based on the first and last words in the selected text region.

15. The method of claim 14, further comprising:

(e) after (b):

(e1) displaying the image, (e2) receiving user input designating at least one image coordinate point within the selected text region, (e3) identifying the at least one active region associated with the at least one image coordinate point designated by the user; and (f) after (d): generating an image of the selected text region;

wherein each active region determined for each word in the image represents a plurality of image coordinate points; and wherein (a) comprises determining word bounding box, text line boundary, and text region boundary information for each of the words, and wherein (b) comprises determining boundaries of the active region for each of the words based upon at least the word bounding box, and one of the text line boundary and the text region boundary information for each of the words.

16. The method of claim 14, further comprising, prior to (a):

(e) determining that the image is warped;

(f) estimating a warp function; and (g) applying the warp function to the image to dewarp the image, and further comprising, after (d):

(h) applying the warp function to an image of the selected text region to warp the image of the selected text region.

17. A method of selecting a text region from an image, comprising:

(a) converting image data into coded text for each word in the image;

(b) determining formatting information for each of the words in the image; the formatting information including word bounding box, text line boundary, and text region boundary information;

(c) determining an active region associated with each word based on the formatting information, each active region representing a plurality of image coordinate points associated with one of the plurality of words; the active regions identifying regions in the image between word bounding boxes, text line boundaries, and text region boundaries within text regions of the image;

(d) identifying a first image coordinate point designating a beginning of a selected text region and a second image coordinate point designating an end of the selected text region;

(e) determining the active region corresponding to each of the first and second image coordinate points;

(f) determining the word associated with each of the active regions corresponding to the first and second image coordinate points; and (g) identifying all the words within the selected text region.

18. The method of claim 17, further comprising:

(h) displaying an image of the selected text region.

19. The method of claim 17, further comprising:

(h) saving the text contained within the selected text region to a clipboard;

(i) transferring the text stored in the clipboard to an application program.

20. The method of claim 19, further comprising:

(j) repeating steps (d) through (i).

21. The method of claim 17, wherein (b) comprises determining word bounding box, text line boundary, and text region boundary information for each of the words, and wherein (c) comprises determining boundaries of the active region for each of the words based upon at least the word bounding box, and one of the text line boundary and the text region boundary information for each of the words.

22. The method of claim 17, wherein (e) further comprises identifying a first active region which includes a first image coordinate point that matches the identified first image coordinate point, and identifying a second active region which includes a second image coordinate point that matches the identified second image coordinate point.

23. The method of claim 17, further comprising, prior to (a):

(h) determining that the image is warped;

(i) estimating a warp function; and (j) applying the warp function to the image to dewarp the image;

and further comprising, after (g):

(k) applying the warp function to an image of the selected text region to warp the image of the selected text region.

24. An article of manufacture for selecting a text region from an image, the article of manufacture comprising computer usable media including computer readable instructions embedded therein that causes a computer to perform:

(a) accessing from a memory device character and formatting information for each word in the image; the formatting information including word bounding box, text line boundary, and text region boundary information;

(b) determining an active region associated with each of the words in the image based on the character information and formatting information for each of the words in the image; the active regions identifying regions in the image between word bounding boxes, text line boundaries, and text region boundaries within text regions of the image;

(c) identifying a first word and a last word in a selected text region based on at least one active region associated with at least one of the words within the selected text region; and (d) identifying all words within the selected text region based on the first and last words in the selected text region.

25. The article of manufacture of claim 24, further causing the computer to perform:

(e) generating character information from image data for each word in the image;

(f) determining formatting information for each word in the image; and (g) storing the character and formatting information for each word in the image.

26. The article of manufacture of claim 24, further causing the computer to perform:

(e) after (b):

(e1) displaying the image;

(e2) receiving user input designating at least one image coordinate point from the displayed image; and (e3) identifying the at least one active region associated with the at least one image coordinate point designated by the user; and (f) after (d): generating an image of the selected text region;

wherein each active region determined for each word in the image represents a plurality of image coordinate points; and wherein (a) comprises determining word bounding box, text line boundary, and text region boundary information for each of the words, and wherein (b) comprises determining boundaries of the active region for each of the words based upon at least the word bounding box, and one of the text line boundary and the text region boundary information for each of the words.

27. The article of manufacture of claim 24, further causing the computer to perform:

(e) displaying an image of the selected text region.

28. The article of manufacture of claim 24, further causing the computer to perform:

(e) storing the text contained within the selected text region in a clipboard; and (f) transferring the image of the selected text region to an application program.

29. The article of manufacture of claim 24, further causing the computer to perform:

(e) copying the text contained within the selected text region to an application program.

30. The article of manufacture of claim 24, further causing the computer to perform:

(e) determining that the image is warped;
(f) estimating a warp function; and
(g) applying the warp function to the image to dewarp the image.

31. The article of manufacture of claim 30, further causing the computer to perform:
(h) applying the warp function to the selected text region to warp the image of the selected text region.

32. An image processing system, comprising:
a character recognition module that provides character information for each word in an image;
a formatting module that provides formatting information for each of the words in the image; the formatting Information including word bounding box, text line boundary, and text region boundary information;
an active region module that provides active region information associated with each of the words in the image based on the character information and the formatting information for each of the words; the active regions identifying regions in the image between word bounding boxes, text line boundaries, and text region boundaries of the image;
a word selection module that provides word selection information indicating which words are included within a selected text region based on the active region information associated with at least one word with the selected text region; and
an image generating module that produces an image of the selected text region based on the word selection information.

33. The image processing system of claim 32, further comprising:
a warp module that produces a warp function for dewarping the image and warping the image of the selected text region.

34. The image processing system of claim 32, further comprising:
a display for displaying the image; and
user I/O for receiving user input designating at least one image coordinate point within the selected text region;
wherein the formatting module determines word bounding box, text line boundary, and text region boundary information for each of the words;
wherein the active region module:
(a) determines boundaries of the active region for each of the words based upon at least the word bounding box, and one of the text line boundary and the text region boundary information for each of the words; and
(b) identifies the at least one active region associated with the at least one image coordinate point designated by the user; each active region determined for each word in the image represents a plurality of image coordinate points.

* * * * *